Patented Dec. 6, 1932

1,889,929

UNITED STATES PATENT OFFICE

GEORGE F. MOORE, OF TAMPA, FLORIDA, ASSIGNOR TO U. S. PHOSPHORIC PRODUCTS CORPORATION, OF NEW YORK, N. Y., A CORPORATION OF DELAWARE

PROCESS OF PURIFYING PHOSPHORIC ACID

No Drawing. Application filed September 25, 1930. Serial No. 484,472.

This invention relates to improvements in processes for the refining of phosphoric acid. In its broader and more general aspects the invention is concerned with the multi-stage conversion of crude phosphoric acid to certain inorganic derivatives of the same, with ultimate reconversion of the final derivative to pure phosphoric acid. More particularly, the invention contemplates the progressive conversion of crude phosphoric acid successively to di-alkali phosphate, di-calcium phosphate, and finally, pure ortho-phosphoric acid.

The present methods for the refining of phosphoric acid produced in any desired manner are all characterized by the treatment of the crude product in the acid form for the elimination of the several impurities present. Such methods have the disadvantage of operating at all times in the presence of acid solutions, thus making for difficult and incomplete separations of precipitated impurities, and are further undesirable in that the several purifying operations necessarily entail considerable dilution of the acid, thereby adding substantially to the cost of the ultimate product, in view of the subsequent concentrating operations necessary.

I have discovered that the refining of phosphoric acid may be accomplished with much less trouble and expense and with substantially enhanced purity of the final product by utilizing as purifying operations the successive conversion of the crude acid to a multiplicity of its inorganic derivatives. The final derivative, according to the operation of my process, is a phosphate of extreme purity, which may then conveniently be reconverted by reacting with sulphuric acid to occasion the formation of pure ortho-phosphoric acid. Purifying methods of this type are particularly advantageous in that separation of the desired values from the phase containing undesirable impurities is effected in the presence of neutral solutions. The segregation of values and impurities in different phases is thus facilitated, and the separation of solid phase from liquid phase more complete. The operation of my process contemplates obtaining the phosphate value of the crude acid in the form of an insoluble salt with a high degree of purity at the last stage of the purifying operation. Such procedure makes possible the formation of concentrated phosphoric acid by treatment of said salt with pure concentrated sulphuric acid, thereby eliminating tedious and expensive concentrating of the final product. The operation of my process has the further advantage of being attended with the production of commercially and industrially valuable by-products, thus effecting an indirect recovery of certain of the reagents used in the process, with consequent lowering of operating costs.

According to a preferred adaptation of the process embodied in my invention, phosphoric acid produced according to any desired procedure is neutralized with sodium carbonate. The resulting reactions occasion the precipitation of a majority of the impurities present in an easily separable state and the formation of soluble di-sodium phosphate which remains in solution. The insoluble precipitates are separated from the solution by decantation and filtration and the phosphate may be further purified, particularly as respects elimination of organic color-imparting impurities, by crystallizing out the di-sodium phosphate from the filtrate. The crystals may be freed of the mother liquor by centrifuging or other suitable means, and washed with saturated di-sodium phosphate solution to eliminate any color-imparting or other impurities which may still be present. The pure crystals are then dissolved in sufficient water to form a concentrated solution of di-sodium phosphate which is reacted with pure gypsum (which may contain a small amount of pure phosphoric acid). As a result of this treatment, the phosphate content of the solution is precipitated in the form of insoluble di-calcium phosphate. The precipitated phosphate is separated from the solution, which is subsequently concentrated preliminary to crystallizing out the pure sodium sulphate.

The di-calcium phosphate obtained as indicated above, is of a high degree of purity and is subjected to the action of pure concentrated sulphuric acid to convert the phosphate to pure ortho-phosphoric acid. Pure snow white gypsum is precipitated during the reaction, and after separation from the solution is recycled to the intermediate step of the process involving the treatment of the di-sodium phosphate solution with gypsum. Recovery of any entrained phosphoric acid by the usual water washing of the gypsum is unnecessary, since such phosphoric acid content does not leave the cycle and is therefore not a source of loss in the process. The solution of phosphoric acid after separation from the precipitated gypsum may conveniently be subjected, if desired, to the usual oxidizing and hydrogen sulphide treatment for the removal respectively of color-imparting impurities and arsenic. The oxidizing treatment will not be needed if the crystallizing step has been employed as hereinbefore described.

It is to be noted that the process as outlined above has a particular advantage over the usual methods for the refining of phosphoric acid in that the major by-product of the process, sodium phosphate, has a substantial commercial and industrial value. This salt is particularly adaptable to both commercial and industrial use, either in the anhydrous form or in the form of Glauber's salt. I prefer, however, to utilize this by-product as a reagent in the operation of one modification of the process set forth in my copending application, Serial No. 475,637, filed August 15, 1930. There is thus possible an indirect recovery of substantially all of the sodium and sulphuric acid used in my process set forth herein.

It is to be clearly understood that my invention contemplates the modification, of the process outlined above, which resides in the substitution of suitable ammonium or potassium equivalents for the sodium referred to in the preceding exposition of my process. For example, instead of neutralizing the crude phosphoric acid to di-sodium phosphate, I may, if desired, neutralize said acid to di-ammonium phosphate or di-potassium phosphate, subsequently treating the solution thus formed as indicated above. Although I have indicated a preference for using carbonates in effecting the said neutralization, the substitution therefor of other suitable basic salts, as for example bi-carbonates or hydroxides, is contemplated in the full exercise of the process of my invention. These and other similar modifications logically concerned with the operation of my process herein set forth, are to be considered as integrally related to said process, and falling well within the scope of my invention.

I claim:

1. A process of refining phosphoric acid, which comprises neutralizing crude phosphoric acid with an alkali thereby forming a solution of di-alkali phosphate, separating the solution of di-alkali phosphate from the insoluble residues and precipitates, treating the solution of di-alkali phosphate with pure gypsum to precipitate pure di-calcium phosphate, separating the said di-calcium phosphate from the remaining solution, subjecting the di-calcium phosphate thus obtained to the action of pure concentrated sulphuric acid to convert the phosphate to pure ortho-phosphoric acid, separating the solution of phosphoric acid so obtained from the precipitated gypsum, and recycling said gypsum to the step of the operation wherein di-alkali phosphate is reacted with gypsum to form di-calcium phosphate.

2. A process of refining phosphoric acid, which comprises neutralizing crude phosphoric acid with an alkali thereby forming a solution of di-alkali phosphate, separating the solution of di-alkali phosphate from the insoluble residues and precipitates, crystallizing out said phosphate, redissolving the crystallized di-alkali phosphate thus obtained, treating the solution of di-alkali phosphate with pure gypsum to precipitate pure di-calcium phosphate, separating the said di-calcium phosphate from the remaining solution, subjecting the di-calcium phosphate thus obtained to the action of pure concentrated sulphuric acid to convert the phosphate to pure ortho-phosphoric acid, separating the solution of phosphoric acid so obtained from the precipitated gypsum, and recycling said gypsum to the step of the operation wherein di-alkali phosphate is reacted with gypsum to form di-calcium phosphate.

3. A process of refining phosphoric acid, which comprises neutralizing crude phosphoric acid with an alkali carbonate thereby forming a solution of di-alkali phosphate, separating the solution of di-alkali phosphate from the insoluble residues and precipitates, treating the solution of di-alkali phosphate with pure gypsum to precipitate pure di-calcium phosphate, separating the said di-calcium phosphate from the remaining solution, subjecting the di-calcium phosphate thus obtained to the action of pure concentrated sulphuric acid to convert the phosphate to pure orthophosphoric acid, separating the solution of phosphoric acid so obtained from the precipitated gypsum, and recycling said gypsum to the step of the operation wherein di-alkali phosphate is reacted with gypsum to form di-calcium phosphate.

4. A process of refining phosphoric acid, which comprises neutralizing phosphoric acid with sodium carbonate thereby forming a solution of di-sodium phosphate, separating the solution of di-sodium phosphate from the insoluble residues and precipitates, treating the solution of di-sodium phosphate with pure gypsum to precipitate pure di-calcium phosphate, separating the said di-calcium phosphate from the remaining solution, subjecting the di-calcium phosphate thus obtained to the action of pure concentrated sulphuric acid to convert the phosphate to pure ortho-phosphoric acid, separating the solution of phosphoric acid thus obtained from the precipitated gypsum, and recycling said gypsum to the second step of the operation wherein di-sodium phosphate is reacted with gypsum to form di-calcium phosphate.

5. A process of refining phosphoric acid, which comprises neutralizing phosphoric acid with sodium carbonate thereby forming a solution of di-sodium phosphate, separating the solution of di-sodium phosphate from the insoluble residues and precipitates, crystallizing out said phosphate, redissolving the crystallized di-sodium phosphate thus obtained, treating the said solution of di-sodium phosphate with pure gypsum to precipitate pure di-calcium phosphate, separating the said di-calcium phosphate from the remaining solution, subjecting the di-calcium phosphate thus obtained to the action of pure concentrated sulphuric acid to convert the phosphate to pure ortho-phosphoric acid, separating the solution of phosphoric acid thus obtained from the precipitated gypsum, and recycling said gypsum to the step of the operation wherein di-sodium phosphate is reacted with gypsum to form di-calcium phosphate.

In testimony whereof, I have signed my name to this specification this 27th day of August, 1930.

GEORGE F. MOORE.

CERTIFICATE OF CORRECTION.

Patent No. 1,889,929.  December 6, 1932.

GEORGE F. MOORE.

It is hereby certified that error appears in the printed specification of the above numbered patent requiring correction as follows: Page 2, line 25, for "phosphate" read "sulphate"; and that the said Letters Patent should be read with this correction therein that the same may conform to the record of the case in the Patent Office.

Signed and sealed this 21st day of February, A. D. 1933.

M. J. Moore,
Acting Commissioner of Patents.

(Seal)